Figure 1:
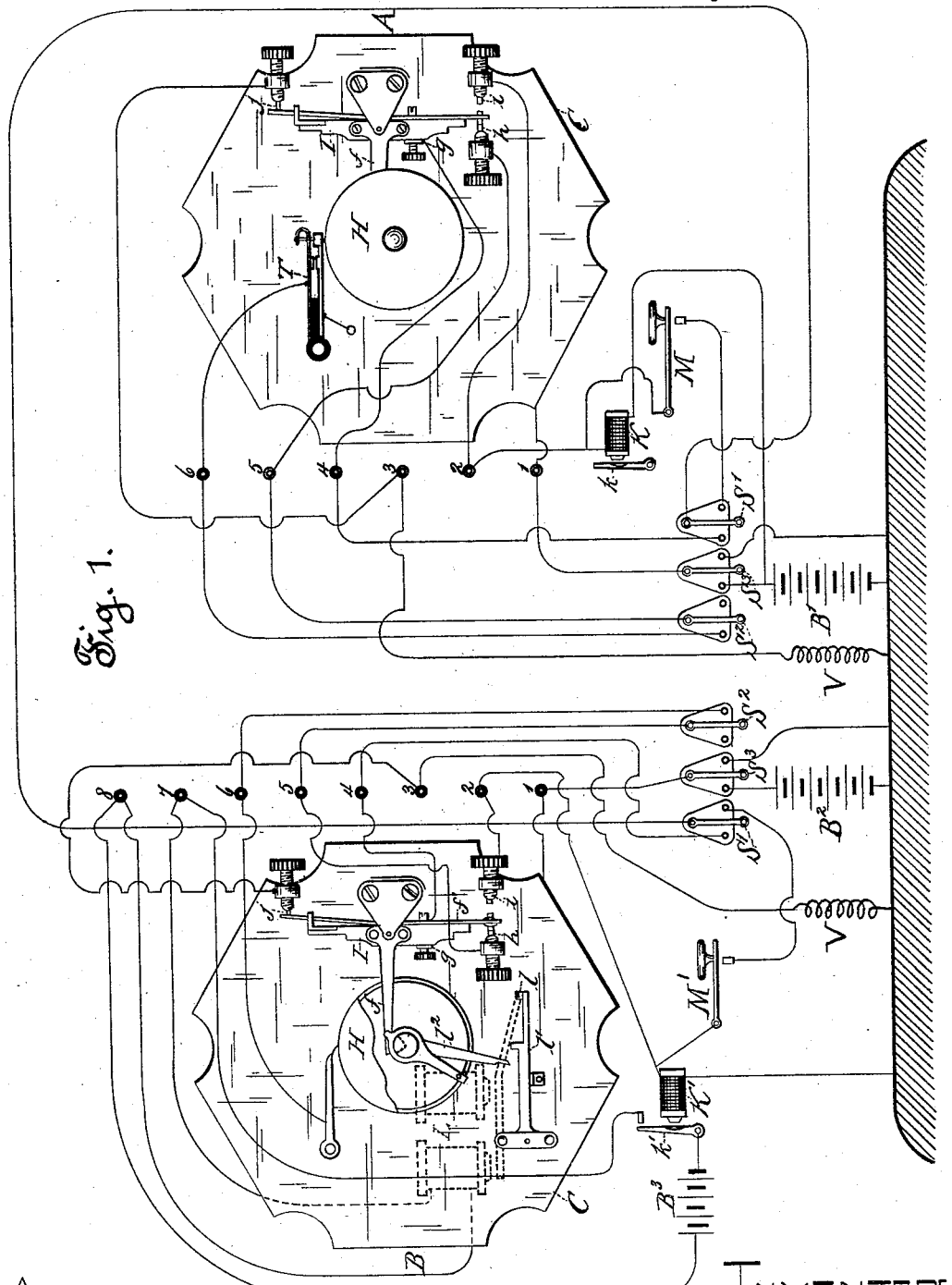

(No Model.)  5 Sheets—Sheet 1.

T. A. EDISON & P. KENNY.
FACSIMILE TELEGRAPH.

No. 479,184. Patented July 19, 1892.

(No Model.) 5 Sheets—Sheet 2.

T. A. EDISON & P. KENNY.
FACSIMILE TELEGRAPH.

No. 479,184. Patented July 19, 1892.

(No Model.) 5 Sheets—Sheet 3.

T. A. EDISON & P. KENNY.
FACSIMILE TELEGRAPH.

No. 479,184. Patented July 19, 1892.

WITNESSES:
D. D. Mott
J. Ellis Clark

INVENTORS
T. A. Edison
P. Kenny
BY Dyer & Wilber
ATTORNEYS.

(No Model.) 5 Sheets—Sheet 4.

T. A. EDISON & P. KENNY.
FACSIMILE TELEGRAPH.

No. 479,184. Patented July 19, 1892.

WITNESSES:

INVENTORS
T. A. Edison
P. Kenny
BY Dyer & Wilber
ATTORNEYS.

(No Model.) 5 Sheets—Sheet 5.

T. A. EDISON & P. KENNY.
FACSIMILE TELEGRAPH.

No. 479,184. Patented July 19, 1892.

Fig. 10.

Wall Street   Nov 26 6 P.M.   Richmond
The books close one week from to day and as that
property is peculiarly fertile in surprises we
do not advise you to delay your purchases.

New York City.

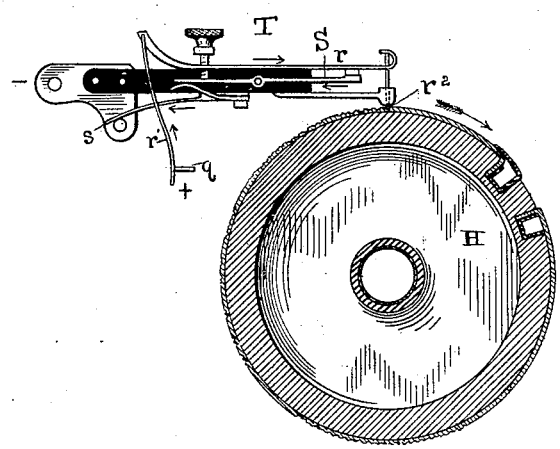

Fig. 11.

WITNESSES:
O. Rowland
W. Pelzer

INVENTORS:
Thomas A. Edison
Patrick Kenny
BY
Rich'd N. Dyer
ATTORNEY.

THE NORRIS PETERS CO., PHOTO-LITHO., WASHINGTON, D. C.

UNITED STATES PATENT OFFICE.

THOMAS A. EDISON, OF MENLO PARK, NEW JERSEY, AND PATRICK KENNY, OF NEW YORK, N. Y.

FAC-SIMILE TELEGRAPH.

SPECIFICATION forming part of Letters Patent No. 479,184, dated July 19, 1892.

Application filed December 6, 1881. Serial No. 47,216. (No model.) Patented in England July 19, 1881, No. 3,140; in Belgium September 15, 1881, No. 55,623; in Canada October 19, 1881, No. 13,577, and in France November 3, 1881, No. 144,646.

*To all whom it may concern:*

Be it known that we, THOMAS A. EDISON, of Menlo Park, in the county of Middlesex and State of New Jersey, and PATRICK KENNY, of New York, in the county of New York and State of New York, have invented a new and useful Improvement in Fac-Simile Telegraphs, (for which we have obtained Letters Patent in Great Britain, No. 3,140, dated July 19, 1881; in France, No. 144,646, dated November 3, 1881; in Belgium, No. 55,623, dated September 15, 1881, and in Canada, No. 13,577, dated October 19, 1881;) and we do hereby declare that the following is a full and exact description of the same, reference being had to the accompanying drawings and to the letters of reference marked thereon.

The object we have in view is to produce telegraphic apparatus for recording at the receiving-station a fac-simile of the original dispatch, which apparatus will be simple in the arrangement and construction of its parts, will be commercially efficient and economical in operation, and will require no special preparation of the original dispatch or particular skill on the part of the operator.

In carrying out our invention we make use of the depressions produced upon the surface of paper or other suitable material by marking, writing, or sketching thereon with a hard lead-pencil or other suitable instrument. For this purpose only slightly more than the ordinary pressure is required upon paper or other suitable material having sufficient body to retain the impressions. A slip or sheet having the message written thereon in this manner is mounted upon a cylinder of insulating material, (preferably of wood,) its ends being secured close together in a groove or grooves of the cylinder. The receiving-sheet used in the instrument at the other end of the line may be of about the same size as the transmitting-sheet, and is soaked in any of the well-known solutions heretofore used in electro-chemical telegraphs. This slip or sheet is secured upon a metal cylinder, being removably fastened thereto in any suitable manner. These insulating and conducting cylinders are mounted upon the revolving spindles of the machines at the ends of the line, which spindles are preferably arranged in vertical positions and turn through metal base-plates resting on insulating-supports. The spindles are revolved by electric motors of the Pacinotti or other pattern. Each motor is arranged with its ring armature in a horizontal position centrally below the cylinder-carrying spindle of the machine. The axle of the motor-armature has a crank-arm on its upper end, to which is secured a slotted curved plate. An inclined rod carrying a centrifugal ball has a box on its lower end, which slides in and is held by the slot of this curved plate. The inclined rod passes up into the collar of a universal rocking joint located centrally below the cylinder-spindle. From this universal rocking joint the inclined rod projects a short distance upwardly into a small box held by a curved slotted crank-arm on the lower end of the cylinder-spindle. The electric motor is run by the current from a battery or other source of electrical energy, the speed of the motor being regulated in any well-known way. Click-springs are struck by a pin on the upper end of the inclined rod when the motor has more or less than its normal speed.

In the operation of the apparatus it is essential that the movements of the two machines should be synchronous, or such parts thereof as affect directly the transmitting and receiving of the message, so that an exact copy of the original can be produced. This is accomplished in the following manner: On the cylinder-spindle of one of the machines, which we will term the "synchronistic machine," is a sleeve, which is held in frictional contact therewith by spring-pressure, the sleeve having a faced disk which rests upon a disk secured to the spindle, the disks being forced together by nuts on the upper end of the spindle, which press on a spiral spring bearing on the end of the sleeve. This sleeve carries the cylinder of the machine, instead of the spindle itself, as in the other machine, which is hereinafter designated the "simple machine."

Since each machine is adapted by changing the form of style and character of cylinder, which are removable parts, to be used either for transmitting or receiving, it is evident that it makes no difference which machine is provided with the cylinder-carrying sleeve.

The spindle of one machine and sleeve of the other are provided near the base-plates with similar cams, each having a smooth concentric surface and a single stepped depression. On each base-plate is pivoted a horizontal T-shaped lever, the central stem of which has a projection working on the cam. The projection on the stem of this lever is thrown into the depression of the cam by a spring, which spring is connected with the line through a switch, which we will designate for clearness the "line-switch."

To the head of each T-lever is secured a metal plate, which is insulated from all parts of the lever except the spring just referred to. This plate carried by the T-lever plays at one end between two adjustable contacts, being kept closed against the inner contact by the concentric surface of the cam and thrown against the outer contact by the spring when the projection on the stem of the T-lever enters the depression of the cam.

The outer contact of each machine is connected with the coils of an electro-magnet having suitable armature, and from thence on one machine the wire runs through a battery to the ground, while on the other machine it passes from the electro-magnet directly to the ground. When the outer contacts of the machines are made at the same time, a circuit will be completed through the electro-magnets. On the simple machine the armature of the magnet is used simply as a sounder, while on the synchronistic machine it has the additional function of making and breaking the circuit of a local battery. This local circuit energizes an electro-magnet supported by the base-plate of the machine, the armature of which when attracted tips a latch engaging with a catch-arm on the cylinder-carrying sleeve before described, the latch engaging the catch and stopping the further revolution of the sleeve until tripped at the same moment the T-lever enters the cam depression, and the relay-magnet is thrown in connection with the line by the making of the outer contact.

The motor of the synchronistic machine is regulated to run with a slightly-greater speed than that of the simple machine, so that its T-lever will make the outer contact and the catch-arm of the sleeve will be locked by the latch just in advance of the making of the outer contact by the simple machine. When the outer contact is made, however, by the T-lever of the simple machine, the line-circuit will be completed through the relay-magnets, and the local circuit of the synchronistic machine will be closed, attracting the latch-armature and releasing the catch-arm of the sleeve, allowing the cylinder to continue its revolving movement. In this manner the two cylinders will be made to start exactly together at each revolution by checking one of them.

In starting the machines the latch is withdrawn by a lever until the synchronistic machine overtakes the simple machine and the two outer contacts are made simultaneously. This will be indicated by the click of the relay-magnet armatures. The latch is then released immediately and checks the cylinder on the next revolution. The slightly-increased speed given one cylinder does not affect the record produced sufficiently to injure its practical value as a fac-simile, but for producing an exact copy in every respect the cylinders used on the synchronistic machine may be made slightly smaller than those of the simple machine.

For giving the necessary signals in starting the machine a Morse key is placed in circuit between a contact of the line-switch and the electro-magnet of each machine. By swinging the line-switch onto the second contact each machine will be cut out of circuit and the Morse key thrown in. After signals are exchanged the line-switches are shifted, throwing in the machines and cutting out the Morse keys.

The cylinders being revolved synchronously, as described, the message is transmitted and received by the following mechanism: Each machine is provided with a weighted carriage traveling vertically and supported by a rack and pinion. The downward drop of each carriage is regulated by an escapement operated by a continuation of the depression in the revolving cam, into which depression takes a projection on the end of the escapement-lever. The carriage is connected electrically with the base-plate, while a vertical guide near the carriage has connection with the inner contact of the T-lever through a switch, which we will term the "style-switch." The base-plate of each machine is connected with a switch, (the battery-switch,) one contact of which switch is connected through a battery to the ground, while the other has a direct ground connection. The transmitting-style carries two contacts, one connected with the carriage when the style is placed in position thereon and through it the base-plate and "battery-switch" and the other by a spring with the vertical guide and through it with the style-switch. One of these contacts is carried by a spring having a point pressing upon the surface of the paper on the insulating-cylinder. The smooth surface of the paper keeps the contacts separated; but when they point into the depression made by a line the contacts come together, completing the circuit through the style-switch and the contact of the T-lever. The receiving-style is insulated from its carriage and has a spring connecting with the vertical guide. This style carries a point bearing upon the surface of the paper, and when the style-switch is closed the current passes through the receiving-style, the recording-paper, and the metal cylinder to the base-plate, from whence it passes to ground through the battery-switch. When the message is completed, the operator at the transmitting-station throws the style off of the cylinder by a lever. This allows the contacts of the style to close and a continuous line is recorded at the receiving-station. This may be used as a signal that the message has been completed. The style-switches are then thrown open and a new set of cylinders put in position. A latch is arranged to lock the escapement when each carriage reaches its lowest position, such latch being released by the movement of the carriage.

In order to neutralize the effect of the static charge in working long lines and produce clear sharp lines at the receiving-instrument, the plate on the head of the T-lever is extended in the form of a spring to the other end of the lever-head, where it strikes a contact connected to the ground through a resistance or its equivalent. This ground-contact is made when the inner contact at the other end of the lever is also made and the ground is further retained for an instant after the inner contact is broken, so that the static charge will pass off into the ground after the battery-circuit is opened by the T-lever and will not operate the relay. This ground-contact, however, is broken before the outer or relay contact is made by the further movement of the T-lever.

The foregoing will be better understood from the drawings, in which—

Figure 2:
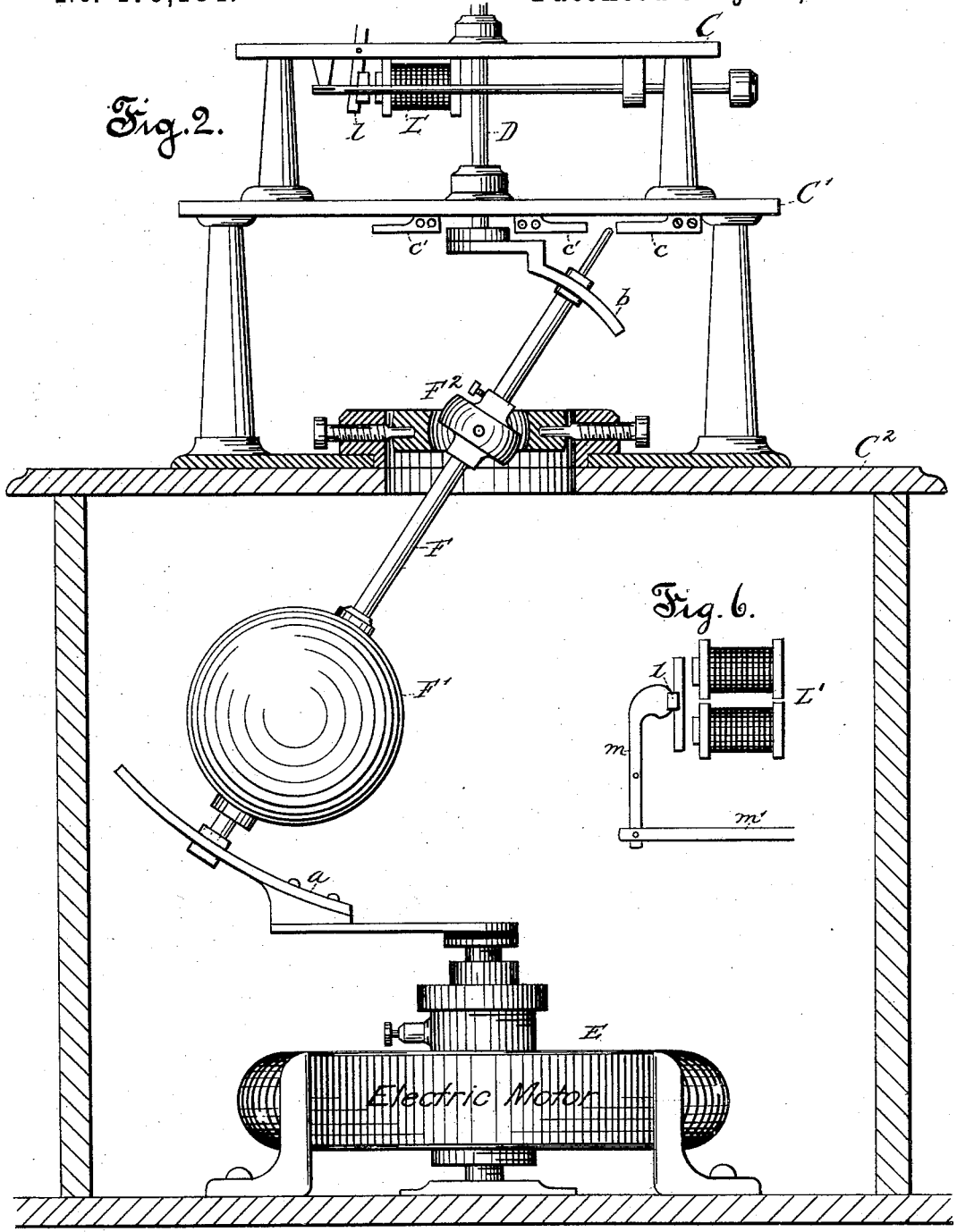
Figure 3:
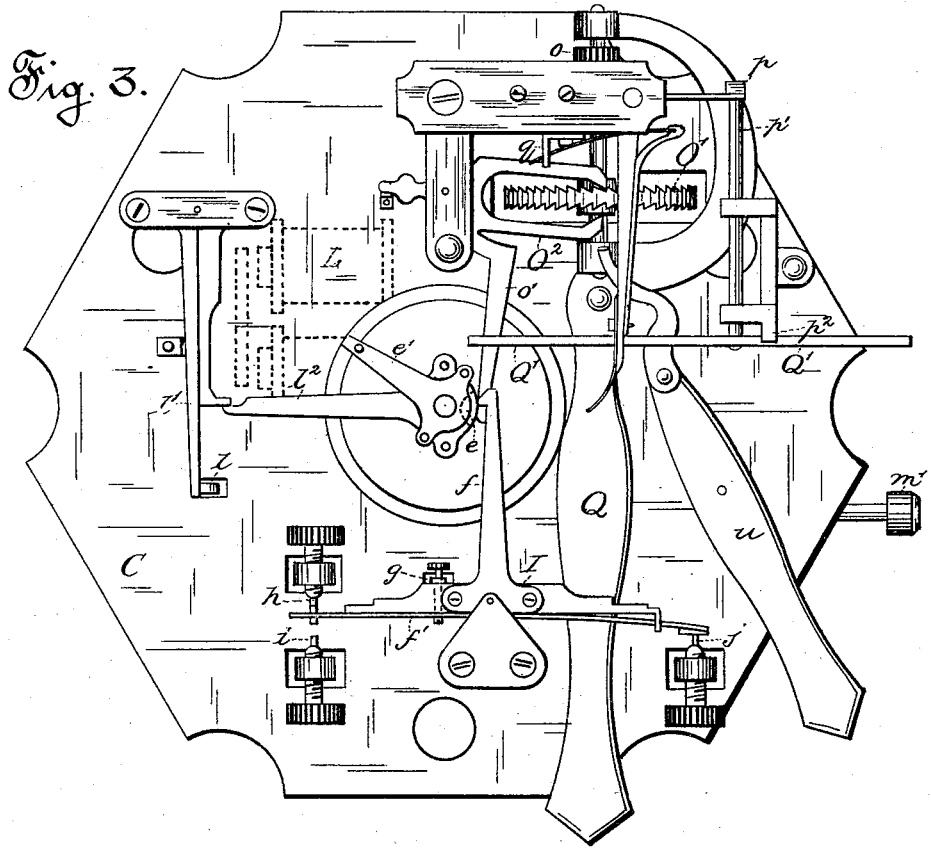
Figure 7:
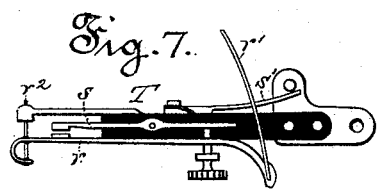
Figure 8:
Figure 9:
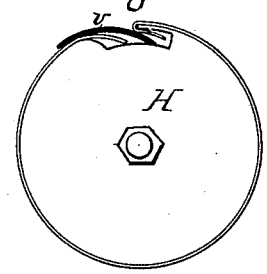
Figure 4:
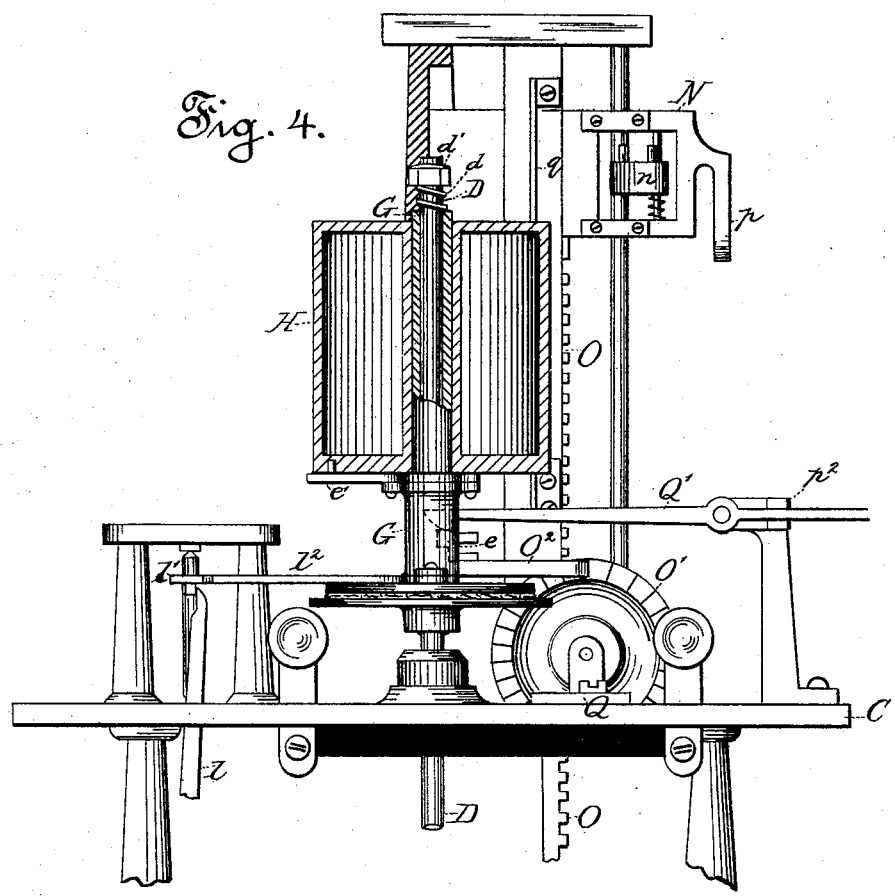
Figure 5:
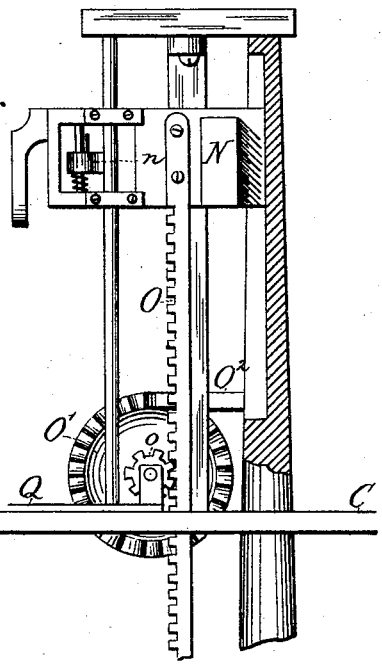

Figure is a diagrammatic view of the circuits and connections; Fig. 2, a vertical section through the motor-case, showing the motor in elevation; Fig. 3, a top view of the synchronistic machine; Fig. 4, an elevation of the upper part of the synchronistic machine, the T-lever being removed for clearness, and the cylinder and sleeve being in vertical section; Fig. 5, a rear elevation of the pen-carriage and the mechanism for regulating its drop; Fig. 6, a top view of the magnet of the synchronistic machine and the lever for controlling its armature; Figs. 7 and 8, top views, respectively, of the transmitting and receiving styles; Fig. 9, an end view of one of the cylinders, showing the means for securing the paper thereto; Fig. 10, a view of a telegram-blank with a message written thereon, and Fig. 11 a sectional view of the transmitting-cylinder with the message-blank secured thereon and the transmitting-stylus in operation.

Like letters and numerals denote corresponding parts in all the figures.

A and B are respectively the simple and synchronistic machine. Each has a base-plate C, mounted on insulating-supports above another plate C', which is supported upon the case $C^2$, inclosing the motor. Through the center of plates C C' passes the vertical spindle D.

E is the electric motor situated in the bottom of case $C^2$ and preferably of the Pacinotti or Gramme pattern. It is arranged horizontally and has a slotted curved crank-arm $a$ on the upper end of its vertical spindle. The spindle D also has a slotted curved crank-arm $b$ on its lower end, and in the slots of the arms $a$ and $b$ move collars on the ends of a rod F, having a centrifugal regulating-ball F' near its lower end. Near arm $b$ the rod F is carried by a universal rocking joint $F^2$. The motor-circuit and the adjustable resistance placed therein are not shown.

The click-springs for indicating when the motor is running at a higher or lower rate of speed than desirable are shown at $c\,c'$.

G is the sleeve of the synchronistic machine, held in frictional contact upon the spindle D by a spring $d$ and nut $d'$. This sleeve and the spindle of the simple machine have the cam depression $e$ (shown in dotted lines) and are provided above the same with an arm $e'$, having a pin which holds and locates correctly either the transmitting or receiving cylinder H.

I is the T-shaped lever, pivoted on base-plate C. Its central stem $f$ has a projection which is thrown into the depression $e$ by a spring $g$, which spring is connected to the line through the line-switch S'. The metal plate $f'$ on the head of the lever I has electrical connection with $g$ and plays at one end between the adjustable outer and inner contacts $h\,i$, while at the other end it springs outwardly and makes contact with $j$. The outer contacts of the two machines are connected with the coils of electro-magnets K K'. From K the wire passes through a battery B' to the ground, which battery may be the main battery at that end of the line. From K' the wire passes directly to ground. The armature $k$ acts simply as a sounder. $k'$, besides performing that function, makes and breaks the circuit of the local battery $B^3$ at the synchronistic machine.

L is the electro-magnet in the circuit of the local battery $B^3$. The pivoted lever $l$, carrying the armature of this magnet, forces back a spring-latch $l'$, which engages a catch-arm $l^2$, carried by the sleeve G. The spring of $l'$ keeps it forward in the path of $l^2$, but the closing of the local circuit forces $l'$ back, allowing the point of $l^2$ to swing clear. The lever for withdrawing the latch $l'$ is shown at $m$, Fig. 6. It is worked by a push-rod $m'$ and forces the armature against the magnet L', holding it there whether such magnet is energized or not.

M M' are the Morse keys for signaling, placed between contacts of S' and the electro-magnets K K'.

The weighted carriage of each machine is designated by N. It slides vertically in ways rising from plate C, as shown, and has a horizontally-pivoted spring-block $n$, upon which either style is placed, the spring throwing the style inwardly against the cylinder. This carriage has a rack O, projecting downwardly therefrom and engaging a pinion o just above plate C.

On the same spindle with pinion O is an escape-wheel O', with which engage the pallets of an anchor $O^2$. This anchor has an arm o' pivoted with a head, which is thrown into the depression e by the anchor-spring allowing the anchor to swing in that direction, while it is thrown in the opposite direction by the forcing of the head of arm o' out of the depression e as the spindle revolves. Thus at every revolution of the cylinder the escape-wheel will move two teeth. The pinion o and escape-wheel O' are supported by a pivoted lever Q, by moving which the pinion can be thrown out of gear with the rack, so that the carriage can be raised independent of the escapement. The carriage has a finger p, which when it reaches its lowest position pushes a pin p' and forces a hook-lever Q' from under a sustaining-lug $p^2$, allowing such lever to drop and engage the arm o' of the anchor $O^2$, so as to prevent the head of such arm from again entering the depression e and stopping the further operation of the escapement. The carriage is connected electrically with the base-plate C by its ways, while the vertical guide q has connection with the inner contact i through the style-switch $S^2$. The base-plate of each machine is connected with the battery-switch $S^3$, one contact of which connects with main battery B' or $B^2$, and the other contact has a direct ground connection.

T is the transmitting-style, having two contacts, one carried by spring r, which is connected by r' with the guide q, when the style is in position on the carriage, and the other by arm s, connected by spring s' with the carriage. The spring r has a point $r^2$, which traverses the surface of the paper and separates the contacts against the pressure of spring r, except when it drops into a depression.

The contacts are shown, for clearness, in Fig. 7 as forced apart, the normal position when the style is removed from the carriage being the reverse.

The receiving-style U, Fig. 8, has its point t connected by a spring t' only with the guide q, the current being carried off through the cylinder to base-plate and thence to ground. A pivoted lever u is used to throw either pen off of the cylinder when the message is complete.

V represents the electro-magnet or resistance, or both, through which the contact j of each machine is connected with the ground.

In Fig. 9 is shown means for securing the paper upon the cylinder. This consists of a spring-plate v, which is forced under the projecting edge of a slot in the cylinder; but any other efficient device can be used.

The binding-posts numbered on the diagram Fig. 1 are for the following circuits: 1, the base-plate circuit; 2, the sounder and relay circuit; 3, the compensation-circuit; 4, the line-circuit; 5 and 6, the style-circuit, and 7 and 8 the local circuit.

The operation of the apparatus is as follows: When no messages are being sent, the switch S' of the machine is thrown to the right, the position of the other switches being immaterial. The throwing of both switches S' to the right establishes a regular Morse line from the ground at the machine A through the battery B' to the relay K, to the key M of the machine A, through switch S' at the machine A to the line, through switch S' at the machine B to the key M' at the machine B, and through the relay K' to the ground. Assume, now, that a message is to be sent from A to B. The operator at A calls the operator at B on the Morse line and makes the predetermined signal which means "receive," and the operator at B answers "ready." Each operator then starts his machine revolving (if not already running) by closing the circuit to the motor E and pushing the pendulum with his hand. The operator at A then puts on his machine a transmitting cylinder and pen, while the operator at B puts on his machine a receiving cylinder and pen, the switches S' being opened or placed in a central position as soon as the Morse signals are understood. Now the operator at A throws his switch $S^3$ to the left, connecting the positive pole of the battery B' with the base of the machine A, while the operator at B throws his switch $S^3$ to the right, connecting the base of the machine B directly with the ground. The switches S' are kept open during this time, so that each operator can keep the line open until he is entirely ready to proceed. As each operator gets ready he connects his machine with the line by moving his switch S' to the left. The line being kept open at each machine, except at one point in the revolution of the cylinder when the plate f' is thrown against the contact h, the relays K K' do not close until the contacts h at the two machines are made simultaneously, which, since the machine B has a slightly-greater speed than the machine A, must occur in the course of a few revolutions. The moment the operator at B hears the click of the relay K' he pulls out the rod m', permitting the armature-lever l to drop away from the magnet L and allowing the spring-latch l' to come forward into the path of the catch-arm $l^2$ on the sleeve G, this bringing the latch l' under the control of the magnet L. Now the latch l' will check the cylinder of the machine B at each revolution, as before explained, so that the machines will run synchronously. Now the operators count the clicks of the relays until the predetermined number has been reached—say ten—and then each operator closes the pen-switch $S^2$, bringing the pens at the same moment into circuit. The pens, which have up to this time been held off of the cylinders by the levers u, are allowed to drop onto the cylinders by moving such levers u, and the carriage-escapements are released by depressing the outer ends of the levers Q', these movements being made before or after closing the pen-switch S², but preferably just before. Now the message will be transmitted, as has been explained, the pen starting at the tops of the cylinders and moving downwardly by a step-by-step movement. When the operator A finds that the transmitting-pen of his machine has passed over all the writing, he lifts the pen off of the cylinder by moving the lever $u$. This allows the transmitting-pen to close the circuit, making a line at the receiving-instrument B. Now both the operators open the pen-switches S² and put on fresh cylinders, raising the pen-carriages to bring the pens to the tops of the cylinders. This is all done while the operators are counting the clicks of the relays, and when ten clicks have been heard the operators are expected to be ready to drop the pens upon the cylinders and close the pen-switches. A small difference in the time when this is done is immaterial in practice, since the transmitting-operator starts the pen far enough above the writing on the blank to allow for any error which might occur. This operation is continued until the operator at A has disposed of all the messages he has to send, when he opens the line at the switch S', stopping the clicking of the relays, when both operators throw their switches S' to the right, putting the apparatus into position to receive a call on the Morse line. If, by reason of any accident to or improper adjustment of the mechanisms—say, for illustration, an improper adjustment of the transmitting-pen—the writing at the receiving-instrument is imperfect, the operator at B opens the line-circuit by opening the switch S' and the relays stop clicking. This indicates to the operator at A that something is wrong, and both operators then close the Morse line, as before explained, by throwing the switches S' to the right and the operators communicate with each other and remedy the difficulty, and then proceed again.

When the operator at B desires to transmit to A, he signals A on the Morse lines, and the operators then put the appropriate cylinders and pens upon their machines and proceed the same as when sending from A to B, as already explained, with the exception that the battery-switches are thrown to the opposite sides, so that the battery B² will supply the current for writing instead of the battery B'.

What we claim as our invention is—

1. A fac-simile telegraph having transmitting and receiving instruments, the transmitting-circuit being controlled by the depressions produced by marking autographically upon paper or other material, substantially as set forth.

2. In fac-simile telegraphs, the combination of the transmitting and receiving instruments with a transmitting-style having circuit connections and contacts in circuit controlled by the depressions in the surface of the prepared message caused by marking autographically thereon, substantially as set forth.

3. In fac-simile telegraphs, the synchronously-revolving cylinders, one carrying the message prepared by marking autographically upon the transmitting-sheet and the other a chemically-prepared recording-paper, in combination with the transmitting and receiving styles having a movement at right angles to the cylinders, the said transmitting-style having contacts in circuit controlled by the depressions in the surface of the message, substantially as set forth.

4. In fac-simile telegraphs, the combination of the synchronously-revolving cylinders with movable contacts operated by the machines for breaking the circuit when the styles are passing the secured edges of the paper, substantially as set forth.

5. In fac-simile telegraphs, the combination of the two machines having cylinders revolving at slightly-different speeds with a device for checking the faster cylinder and contacts made simultaneously by the two machines for operating the checking device by completing the circuit through the same, substantially as set forth.

6. In fac-simile telegraphs, the combination of two machines having cylinders revolving at slightly-different speeds with a checking device for the faster cylinder, operated by an electro-magnet in the circuit of a local battery, and contacts made simultaneously by the two machines and completing the main circuit through an electro-magnet controlling said local circuit, substantially as set forth.

7. In fac-simile telegraphs, the combination of the cylinders and the electro-magnetic checking device with sounders for indicating the synchronism of the cylinders, signaling-keys placed in shunts around the machines, and switches for throwing in and out the machines and keys alternately, whereby the sounders will be operated by the machines or the keys, according to the position of the switches, substantially as set forth.

8. In fac-simile telegraphs, the combination of the two machines having cylinders and motors revolving the said cylinders at different speeds and an electro-magnetic checking device for one of them with a pivoted lever on each machine connected to line and two contacts between which said lever plays, one connected through the style-circuit to battery or ground and the other through the relay and sounder circuit, such lever being moved once during each revolution of each cylinder to break the style-circuit and make the relay and sounder circuit, substantially as set forth.

9. In fac-simile telegraphs, the combination, with the synchronously-revolving cylinders and motors and the transmitting and receiving styles, of cams revolving with the cylinders, pivoted levers worked by said cams and connected to line, and making contacts for completing the style, the sounder, and the "compensation" circuits, substantially as set forth.

10. In fac-simile telegraphs, the combination, with the revolving cylinders and the motors working such cylinders, of the revolving cams and the style-carriages controlled by escapements worked by said cams and having a step-by-step movement, substantially as set forth.

11. In fac-simile telegraphs, the combination of the electric motors with weighted centrifugal arms arranged oblique to the motor-shafts, said arms being carried by universal rocking joints and connecting the motors with the driven mechanisms, substantially as set forth.

12. In fac-simile telegraphs, the combination of the horizontal electric motors with the weighted centrifugal arms arranged oblique to the motor-shafts, said arms being carried by universal rocking joints and the slotted cranks, substantially as set forth.

This specification signed and witnessed this 26th day of July, 1881.

THOS. A. EDISON.
PATRICK KENNY.

Witnesses:
RICHD. N. DYER,
H. W. SEELY.